May 26, 1931.  E. H. COOPER  1,807,099
SPRING END CONNECTION
Filed Nov. 3, 1928
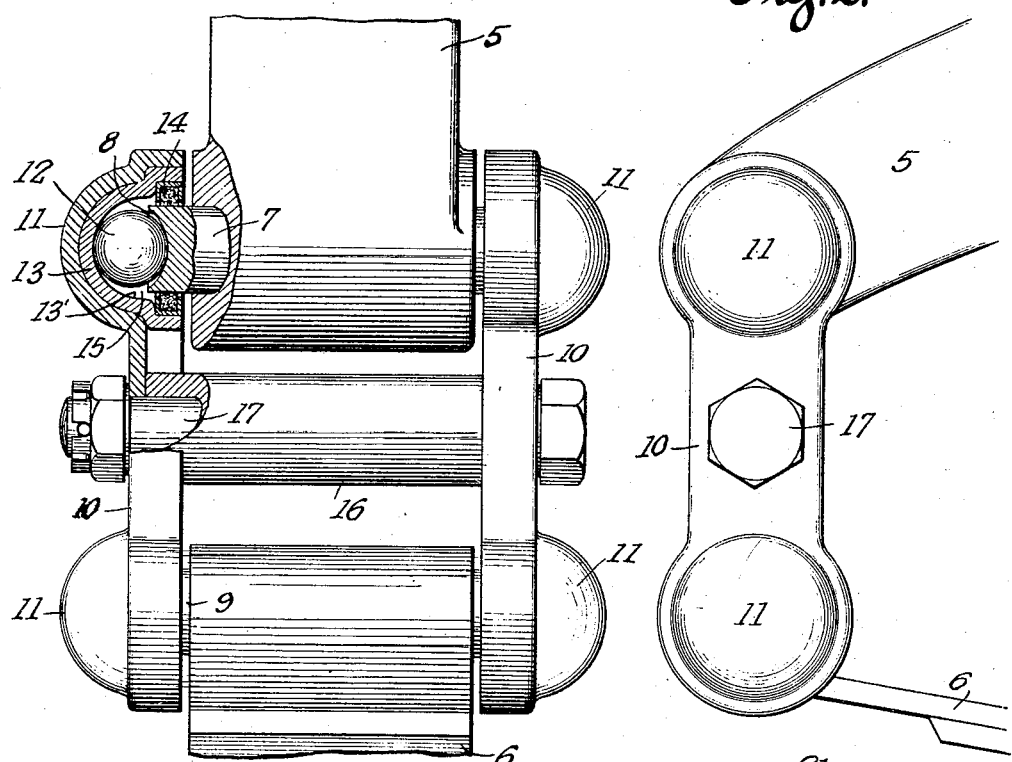
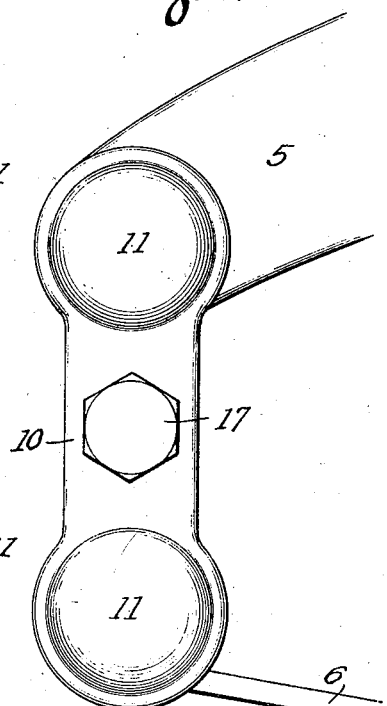
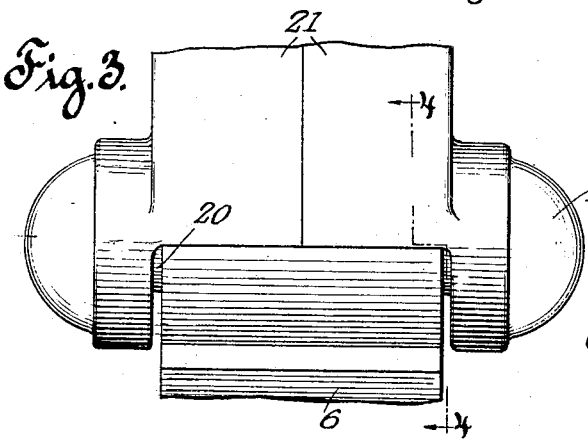
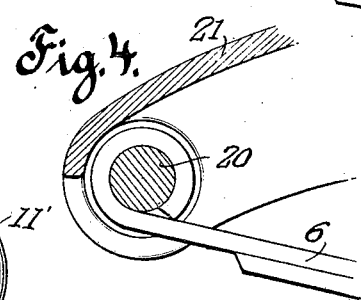
INVENTOR
Elisha H. Cooper
BY
Mitchell Berhut
ATTORNEYS Patented May 26, 1931

1,807,099

UNITED STATES PATENT OFFICE

ELISHA H. COOPER, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING END CONNECTION

Application filed November 3, 1928. Serial No. 316,899.

My invention relates to a spring connection for connecting the spring and frame of a motor vehicle.

It is a general object of the invention to provide an improved spring connection wherein a single ball may be provided at each moving point so as to reduce friction and facilitate lubrication.

Other objects and advantages will be apparent upon a reading of the specification.

Briefly stated, in the preferred form of the invention I provide means at opposite sides of the frame or spring, or both, having seats or cups preferably of curved dish-like form of a curvature somewhat greater than the curvature of a single ball which rides upon each seat. Side members, which may be part of the spring or frame or separate shackle links, are provided with dished bearing seats or cups complementary to the first mentioned cups, and interposed between each pair of complementary cup seats is a single ball. By making the curvature of the seats slightly greater than the curvature of the interposed single ball, a slight oscillation or rocking of the ball is permitted during movement of the connected parts, and this rocking coupled with the rotative movement between the connected parts has a tendency to rotate the balls slightly, thus eliminating wear on the ball at concentrated points, and at the same time provides for a more satisfactory lubrication of the balls and coacting bearing seats. The connection is arranged so that both radial and thrust loads are carried by the balls.

In the drawings which show, for illustrative purposes only, preferred forms of the invention—

Fig. 1 is a partially sectional end view of a frame and spring connected by shackle means embodying my invention;

Fig. 2 is a side elevation of the parts shown in Fig. 1;

Fig. 3 is an end elevation of a hinge end connection embodying features of the invention;

Fig. 4 is a sectional view taken substantially in the plane of the line 4—4 of Fig. 3.

In the shackle construction shown in Figs. 1 and 2, 5 indicates a frame of a motor vehicle while 6 indicates the spring to be connected thereto by means of my improved shackle construction. Since the construction is preferably symmetrical, only one corner has been shown in section, and the details there shown may be duplicated at the other three bearing points. The frame is provided with means such as a pin 7 rigidly held to the frame and having at opposite sides thereof dished cups or seats such as 8. The spring 6 is also provided with means such as a pin 9 rigidly held to the spring 6, and which may be in all respects a duplicate of the pin 7.

The spring and frame are connected by a shackle which, in the specific form illustrated, is composed of two separate links 10—10 formed of pressed metal and provided at opposite ends with seats 11—11, which may be and preferably are duplicates of each other. A single ball such as 12 is interposed between each of the seats, as 8 at the end of each pin 7—9 and the complementary seat formed at each end of the shackle links 10—10. Instead of forming the seats in the shackle links directly thereon, I prefer to employ a separate seat cup 13 seated in the receiving sockets or seats 11—11. The curvature of the bearing surface 13' of each seat cup 13 is somewhat less than the curvature of the ball 12.

The space between the ends of the pins 7—9 and the shackle links 10—10 are closed as by rings 14 of felt or other material, which will serve to exclude dust from the balls and bearing seats and house or retain the lubricant in the lubricant space 15. If desired, the pins 7—9 may be made hollow so as to hold a supply of lubricant in excess of that held in the space 15.

The shackle links 10—10 may be definitely spaced apart as by means of a spacer sleeve 16 and held in such position by means of a through bolt 17, as will be clear from the drawings. By making the spacer 16 of definite length and by providing the bearing cups as 8 at opposite ends of each pin at a definite distance apart, the balls will be fitted with just the desired degree of looseness to function properly.

With the parts arranged as shown in Figs. 1 and 2, it will be clear that the pin 7 is urged downwardly by the frame and the pin 9 urged upwardly by the spring. With the balls as 12 fitted with the desired degree of looseness, a line connecting the points of contact of each ball with its respective seats will be inclined so that in effect each ball would form part of an angular contact bearing, and both radial and thrust loads will be taken by the balls themselves.

When the vehicle is in use and passing over average roads, there will be a constant rotative movement of each shackle link relatively to the pins 7 and 9, and there will also be slight separation and approach of the pins 7—9 relatively to each other, due to the increase or decrease of force exerted by the spring and frame while the car passes over obstructions in the road. This slight separation and approach of the pins 7 and 9 relatively to each other will cause the balls to rock or oscillate slightly in their respective seats, and this slight rocking or oscillation coupled with the slight rotative movement heretofore mentioned will permit the balls to rotate slightly and thus eliminate wear at any specific points on the balls. The movements of the balls due to the relative separation and approach of the pins 7 and 9 relatively to each other will be a rocking or oscillating movement, and the rotative movement between each pin 7 and 9 and the shackle links would ordinarily cause a pure sliding action between the balls and their respective seats, but, due to the oscillating movement heretofore mentioned, the balls will also partake of the slight rolling movement, and the rotative movement between the pins and shackle links will not cause the pure sliding movement, but a combined sliding and rolling movement. This combined sliding and rolling movement of the balls on their seats in addition to reducing wear normally occasioned between sliding parts will assist in the lubrication of the bearing surfaces; that is to say, as the balls rock there will be new areas of contact between the balls and their seats, and since the spaces as 15 may be filled with lubricant the new contact surfaces will be well lubricated.

In the hinge end construction illustrated in Figs. 3 and 4, only a single pin 20 is employed. This pin is preferably secured to the spring 6, while the side members carrying the bearing cups 11'—11' are carried by the frame. Obviously, this relationship could be reversed. Since the balls and seats employed with the hinge end construction illustrated in Figs. 3 and 4 may be in all respects similar to those heretofore described in connection with the shackle end of the spring, no separate illustration has been made in connection with Figs. 3 and 4.

The bearing cups or seats 11'—11' may be held on the frame in any suitable manner, which will permit assembly of the parts. In the illustrative form shown, the cups 11'—11' are carried by separable links or side plates 21—21, which are rigidly secured to the frame. The action of the balls at opposite ends of the pin 20 will be substantially the same as that heretofore described in connection with the shackle, and no separate description need here be given.

In certain types of springs, for example the so-called cantilever springs, the spring is hingedly connected at one end to the axle of a vehicle rather than to the frame. The principle of operation of my invention is the same whether the spring is to be connected to an axle or to a frame, and I therefore use the term "frame" in a generic sense to include the axle, for example.

It will be seen that in accordance with my invention the spring and frame may be connected to each other by means of a single ball at each supporting point, and that each single ball may partake of a rolling and sliding movement relatively to its bearing seats, so that wear will be reduced and lubrication facilitated.

While forms of the invention have been described in some detail, I do not wish to be strictly limited to the forms illustrated, for many changes may be made in the structure without departing from the spirit of the invention as defined in the appended claims.

I claim:

1. In a spring connection for connecting a frame and spring, one of said members having means at opposite sides thereof and provided with cup-shaped bearing recesses, means supported by the other of said members and having cup-shaped bearing recesses complementary to said first mentioned recesses, and a single ball between the complementary cup-shaped bearing seats at opposite sides of one of said members said seats being of a size to permit a limited rolling of said balls.

2. In a spring connection, a spring having pin means secured thereto, said pin means having cupped bearing seats at the opposite sides of said spring, means supported from said frame and having cup-shaped bearing seats complementary to those on said pin means, and a single ball at each end of said pin means and interposed between said complementary cup-shaped seats said seats being of a size to permit limited rolling of said balls.

3. In a spring connection for connecting a frame and spring, means carried by one of said members and having definitely spaced apart inwardly directed bearing cup recesses therein, means carried by the other of said members and having bearing cup means complementary to said first mentioned bearing cup means, and a single ball between each pair of complementary bearing cup means said bearing cup means being of a size to permit limited rolling of said balls.

4. In a spring connection for connecting a frame and spring, means carried by said frame and having bearing cups at opposite sides of said frame, means carried by said spring and having bearing cups at opposite sides thereof, shackle links having bearing cups at the ends thereof and complementary to the bearing cups on said means carried by said spring and by said frame, means for holding said shackle links rigid relatively to each other, and a single ball interposed between the bearing cups at each end of said shackle links and the complementary bearing cups carried by said spring and frame, said cups being of a size to permit limited rolling of said balls.

5. In a spring end connection, a pin to be carried by a spring and having cup-shaped bearing surfaces at opposite ends thereof, side members having bearing cups complementary to those at opposite ends of said pin, and a single ball interposed between each of said complementary bearing cups said cups being of a size to permit limited rolling of said balls.

6. In a spring connection, means having definitely spaced apart bearing cups thereon, means having definitely spaced apart bearing cups complementary to said first mentioned bearing cups, and a single ball interposed between each pair of said complementary bearing cups said cups being of a size to permit limited rolling of said balls.

7. In a spring connection, means having definitely spaced apart bearing cups thereon, means having definitely spaced apart bearing cups complementary to said first mentioned bearing cups, and a single ball interposed between each pair of said complementary bearing cups, the radius of curvature of said bearing cups being greater than the radius of curvature of said balls.

8. In a spring connection, means having definitely spaced apart bearing cups thereon, means having bearing cups complementary to said first mentioned bearing cups, a single ball interposed between each pair of said complementary bearing cups, and means for closing the space between said bearing cups for housing lubricant and excluding dust from the balls and their bearing surfaces said cups being of a size to permit limited rolling of said balls.

9. In a spring shackle construction for connecting a vehicle frame and spring, pin means to be carried by a frame and having bearing cups at opposite sides thereof, pin means to be carried by a spring and having bearing cups at opposite sides thereof, shackle means having bearing cups complementary to said first mentioned cups, and a single ball interposed between each pair of said complementary bearing cups said cups being of a size to permit limited rolling of said balls.

10. In a spring shackle construction, pin means to be secured to a frame and having bearing cups at opposite sides of said frame, pin means to be secured to a spring and having bearing cups at opposite sides thereof, shackle links, separate bearing cups carried by said links at opposite ends thereof and complementary to the bearing cups on said pin means, a single ball interposed between each pair of said complementary bearing cups, a dust ring for closing the space between each said separate bearing cup and said pin means for housing lubricant and excluding dust from said balls and bearing surfaces, and means for holding said shackle links in definite spaced apart relation to each other said cups being of a size to permit limited rolling of said balls.

11. In a spring connection for connecting a frame member and spring member, one of said members having means provided with antifriction bearing seats at opposite sides of said member, means supported by the other of said members and having antifriction bearing seats complementary to said first mentioned seats, and a single ball between each pair of complementary bearing seats at opposite sides of said member said seats being of a size to permit limited rolling of said balls.

12. In a spring connection for connecting a frame member and spring member, one of said members having means provided with antifriction bearing seats at opposite sides of said member, means supported by the other of said members and having antifriction bearing seats complementary to said first mentioned seats, and a single ball between each pair of complementary bearing seats at opposite sides of said member, said bearing seats being of curved dish-like form, the radius of curvature of each of said seats being greater than the radius of curvature of the adjacent ball to permit a limited rolling action of the balls.

13. In a spring connection for connecting a frame member and spring member, one of said members having bearing seats at opposite sides of said member, said seats being constructed to receive only a single ball, means supported by the other of said members and having seats thereon complementary to said first mentioned seats and constructed and arranged to receive only a single ball, a single ball interposed between each pair of complementary seats, said seats being of an extent sufficient to permit a limited rolling action of said balls.

ELISHA H. COOPER.